United States Patent [19]

Tornstrom

[11] 4,134,387

[45] Jan. 16, 1979

[54] SOLAR ENERGY CONCENTRATOR

[75] Inventor: Eric Tornstrom, West Acton, Mass.

[73] Assignee: Mobil Tyco Solar Energy Corporation, Waltham, Mass.

[21] Appl. No.: 781,839

[22] Filed: Mar. 28, 1977

[51] Int. Cl.² .............................................. F24J 3/02
[52] U.S. Cl. .................................... 126/270; 126/271; 350/293; 350/295
[58] Field of Search ................ 350/295, 293; 126/270, 126/271; 237/1A

[56] References Cited
U.S. PATENT DOCUMENTS

| | | | |
|---|---|---|---|
| 3,893,755 | 7/1975 | Cobarg et al. | 350/295 |
| 3,915,147 | 10/1975 | Rineer | 126/271 |
| 4,056,309 | 11/1977 | Harbison et al. | 126/270 |
| 4,068,361 | 1/1978 | Root | 126/271 |

Primary Examiner—Kenneth W. Sprague
Attorney, Agent, or Firm—Schiller & Pandsicio

[57] ABSTRACT

Low cost solar collectors are constructed by stretching a thin elongate, flexible reflective sheet (such as metallized polyethylene terephthalate film) over a frame so as to provide a ridged surface of desired geometric shape. In a preferred embodiment of the invention the frame comprises a plurality of rod-like members, with a supply reel on one end and a take-up reel on the other end. Extra reflective sheet material is stored on the supply reel so that when the sheet material in the concentrator degrades (after prolonged exposure to sun light), the degraded material can be rolled onto the take-up reel and fresh sheet material disposed in its place on the frame.

12 Claims, 5 Drawing Figures

U.S. Patent    Jan. 16, 1979    Sheet 1 of 2    4,134,387
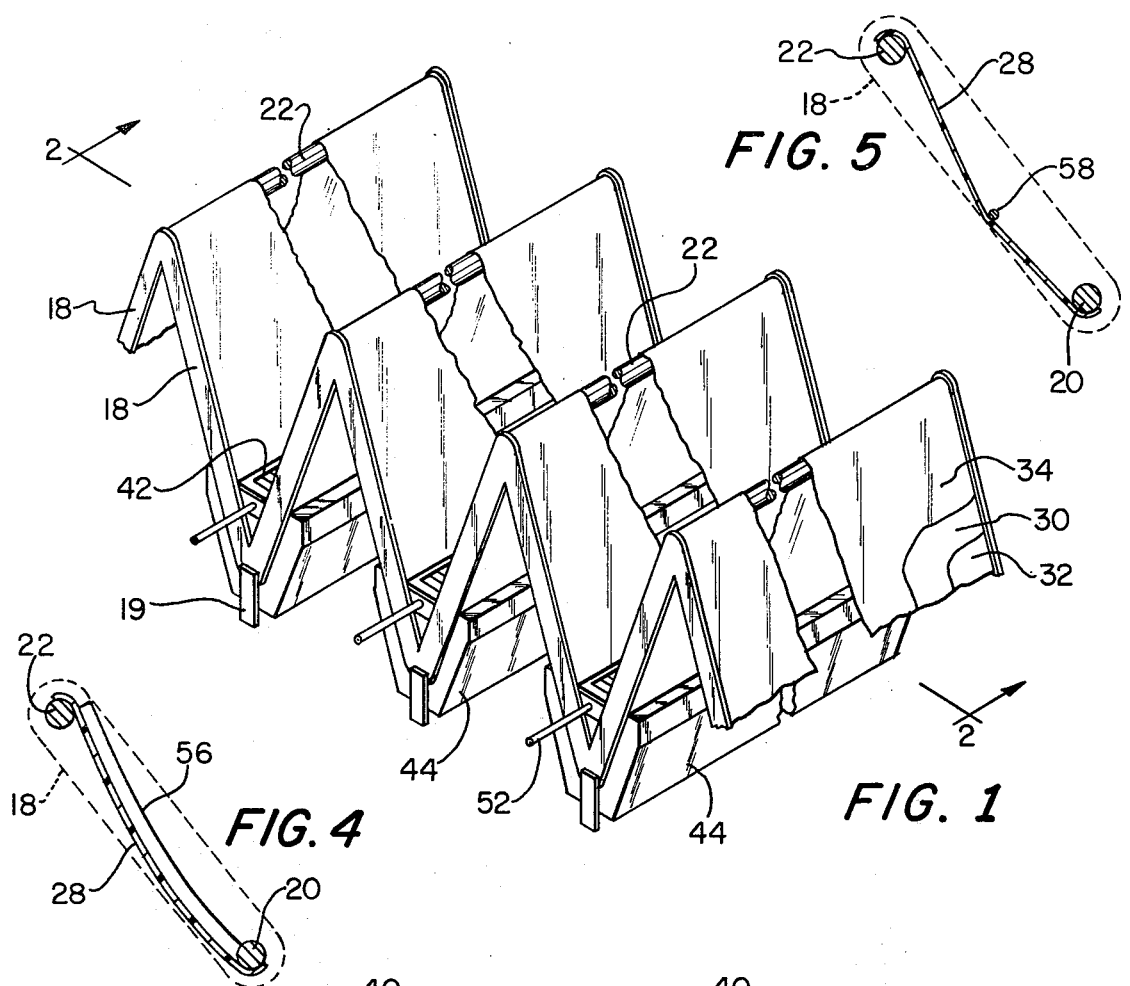
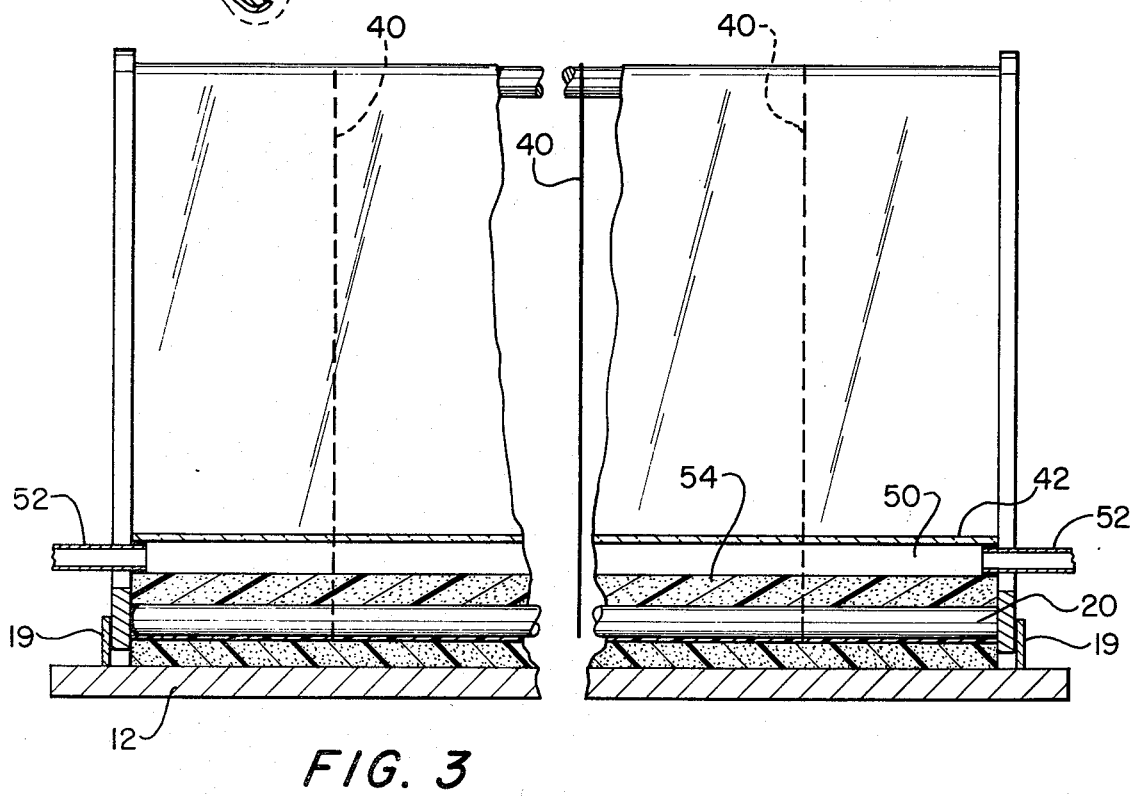

SOLAR ENERGY CONCENTRATOR

The present invention relates to solar energy collector systems, and more particularly to a novel and low cost solar energy concentrator which is useful in the collection and utilization of solar energy, and to a relatively low cost, labor saving method for erecting and maintaining such a solar energy concentrator.

It is well known that solar energy may be converted into other useful forms of energy by using proper techniques. For example, solar energy may be converted into electrical energy by a so-called solar cell. The most common solar cells are made of silicon, but cells made of other materials, e.g., cadmium sulfide and gallium arsenide, have also been developed and tested. The required voltage and/or amperage may be generated using an appropriate series-parallel matrix in an integrated array.

At the current state of the art, a principal obstacle to wide scale adoption of solar cell energy collector installations is that manufacturing and installation costs of solar cell arrays generally are substantially higher than the cost of conventional electrical energy generating installations. Another factor limiting wide spread adoption of solar panel cells is radiant heating of the cells which reduces cell efficiency.

While the cost of manufacturing the solar cells per se currently is the single largest cost factor in the manufacture of a solar cell energy collector installation, any technique which increases the overall efficiency of a solar cell energy collector, or which reduces the cost of manufacturing and/or installing a solar cell energy collection system may have significant commercial importance.

In addition to the photoelectric conversion technique just described, it is well known that solar energy may be converted to other more useful forms of energy through thermal conversion techniques. Typically thermal conversion techniques involve using sunlight to heat up a liquid or gas contained in a thermal converter enclosure and then utilizing the heated liquid or gas in an appropriate manner well known to one skilled in the art to generate power.

However, as in the case of solar cells, relatively low energy collection efficiency, relatively high cost of manufacturing and relatively high installation costs have presented a principal obstacle to wide scale adoption of solar thermal energy collectors. Thus, any technique which increases the overall efficiency of a solar thermal energy collector of which reduces the cost of manufacturing and/or installing a solar thermal energy collector system may have significant commercial importance.

One technique the art has developed to increase efficiency of solar cells and thermal converters is to collect and focus solar energy onto the solar cells or thermal converters by means of a so-called "solar concentrator". Thus a typical solar energy collection system may include reflective or refractive devices which are designed to collect solar energy impinging upon a relatively large area and to focus the collected energy onto a relatively small area of utilization. While the use of solar concentrators result in economic savings by increasing the effective collection area of a solar cell or thermal converter, the solar concentrators themselves are somewhat costly to manufacture, and also may add appreciably to the weight of the solar energy collector system. This latter consideration is particularly important in the case of solar cell or solar thermal energy collector systems which are to be used on buildings since the heavier a solar energy collector system is, the more costly the required supporting structure.

Accordingly, a primary object of this invention is to provide a solar energy concentrator which substantially overcomes or avoids a number of the aforesaid problems encountered in the manufacture and use of solar energy collector systems according to prior art. Another object is to provide a method of making solar energy concentrators which are especially light weight, and which can be manufactured using relatively inexpensive, commercially available materials. Yet other objects of the invention are (1) to provide solar energy concentrators which may be effectively and easily employed for the collection and utilization of solar energy, (2) to provide solar energy concentrators of the type described in combination with solar cells for increasing the intensity of radiation received by such cells and also for distributing the concentration of such radiation, and (3) to provide relatively low cost, labor saving methods for erecting and maintaining solar energy collectors of the type described. Still other objects are to provide solar cell collection systems with means for cooling the solar cell, and to provide solar energy concentrators of the type described in combination with solar thermal converters.

These and other objects hereinafter described or rendered obvious are achieved by providing a solar energy concentrator which essentially comprises a thin, elongate, flexible sheet material which is reflective to light, and a rigid frame for supporting the flexible sheet material so as to form a ridged surface of desired geometry. In a preferred embodiment of the invention the frame comprises a plurality of upper and lower rod-like members in spaced relation to one another, and has a supply reel at one end of the frame and a take-up reel at the other end. The flexible sheet material is stretched on the frame between the supply reel and the take-up reel. Extra reflective sheet material is stored on the supply reel so that when the sheet material in the frame degrades, as after prolonged exposure to sunlight, the degraded material can be rolled onto the take-up reel and fresh sheet material disposed in its place on the frame.

Other features, modifications and advantages of the invention are set forth in the following detailed description which is to be considered together with the accompanying drawings wherein like numbers refer to like parts.

FIG. 1 is a perspective view of one embodiment of solar energy concentrator constructed in accordance with this invention;

FIG. 3 is a sectional view taken along line 3—3 of FIG. 2;

FIG. 4 is a side elevational view, in cross-section, showing a portion of an alternative concentrator; and FIG. 5 is a side elevational view, in cross-section, showing a portion of another and preferred embodiment of concentrator.

Figure 2:
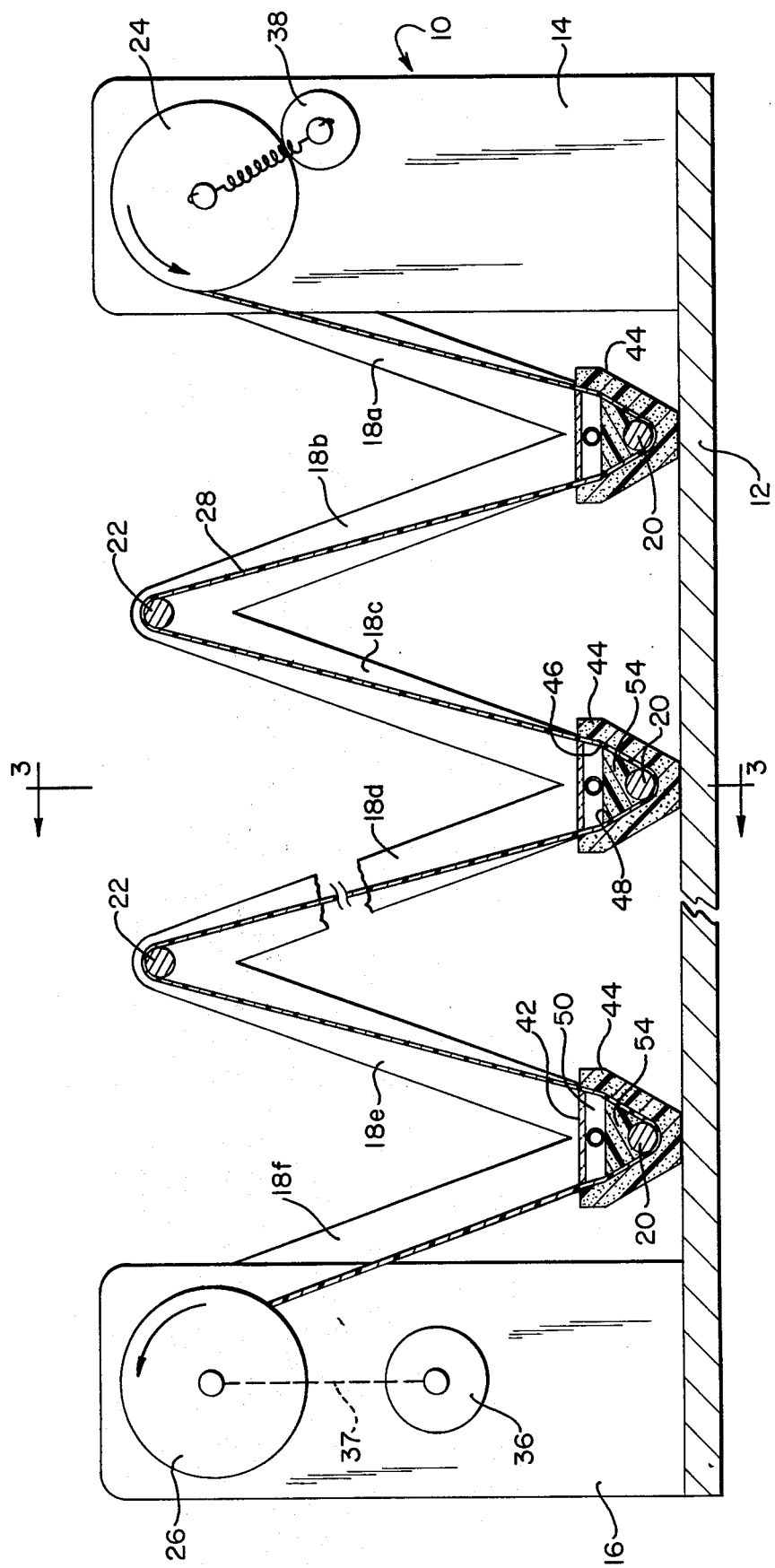
FIG. 2 is an elevational view of the concentrator of FIG. 1, and with a portion of the view being a section taken along line 2—2 of FIG. 1.

Referring to the drawings there is illustrated a preferred embodiment of the present invention comprising a solar energy concentrator in combination with a solar cell array and thermal energy collector. The illustrated solar concentrator comprises a rigid frame indicated generally at 10 having an elongate base member 12, two pairs of upwardly extending corner members 14 and 16 affixed one each at the four corners of base member 12 only one each of members 14 and 16 are shown), and a plurality of generally upwardly inclined side members 18a, 18b, 18c, 18d, 18e, 18f located at each side of base member 12. As seen in FIG. 2, the corner members 14 and 16 extend substantially perpendicularly upwardly from base member 12, while adjacent ones of the side members 18a – 18f are oppositely inclined relative to one another so as to define, together with base member 12, a repeating triangular lattice pattern. Side members 18a-18f are fastened together and also to struts 19 at their points of intersection as by welding, and struts 19 in turn are affixed to base member 12 so as to form a rigid structure. The lengths of members 18a-18f and their relative spacing along base member 12 are selected so that a predetermined angle of intersection between adjacent side members is obtained as will be described in detail hereinafter.

Also forming part of frame 10 are a plurality of spaced lower and upper guide members in the form of elongate solid rods 20 and 22, respectively. Lower guide members 20 are arranged generally parallel to one another, and are fixedly mounted substantially perpendicular to the long dimension of member 12, at the intersection of the side members at their lower ends, e.g. 18a and 18b, 18c and 18d and 18e and 18f. Upper guide members 22 are also arranged generally parallel to one another and also parallel to lower guide members 20. The upper guide members 22 are supported at a substantially uniform height above base member 12, at the intersection of the side members at their upper ends, e.g. 18b and 18c, 18d and 18e. Guide members 20 and 22 may be affixed to the side members by welding or other suitable means. Also forming a part of frame 10 are a supply reel 24 and a take-up reel 26 which are supported by and extend between the corner members 14 and 16 respectively. Reels 24 and 26 are mounted for rotation on their axes adjacent the upper ends of corner members 14 and 16. The purpose of reels 24 and 26 will become apparent from the discussion following.

The present invention is predicated in part on the use of relatively low cost and light-weight materials which are readily available commercially to form solar energy concentrators as described herein. Thus in accordance with the objects of the invention, a thin, elongate, flexible sheet 28 which is reflective to light is threaded alternatively under one lower guide member 20, then over the next-in-line upper guide member 22, in repeated fashion between supply reel 24 and take-up reel 26 so as to form a stable ridged construction. Reflective sheet 28 preferably comprises a plastics film such as polyethylene terephthalate film (available commercially under the trademark "MYLAR"), covered on one side with a reflective and flexible metal coating such as aluminum film on foil 30. However, other commercially available plastics film materials such as cellulose triacetate, polyethylene and fluorinated ethylene propylene (FEP) may be used. Alternatively, reflective 28 may comprise a support web or net having a reflective foil bonded to one side of the net. In an especially preferred embodiment of the invention reflective sheet will comprise a reflective metal film 30 sandwiched between two layers 32, 34 of Mylar film (FIG. 1), so as to provide support and environmental protection for the metal film. Completing the concentrator are means such as motor 36 mechanically connected as indicated by broken line 37 so as to drive take-up reel 26 and a spring-biased drag wheel 38 in contact with the supply reel 24, for drawing flexible sheet 28 through the array of upper and lower guide rods and for maintaining the sheet under tension. If required one or more stiff guide wires 40 (FIG. 3) may be disposed between the upper and lower guide rods 22 and 20 respectively, for supporting sheet 28 and maintaining it in a desired shape between the rods. The result is essentially a ridged reflecting surface with flexible sheet 28 being held under tension and forming troughs whose sides function as Mangin mirrors.

Flat semiconductor solar cells 42 of conventional construction are mounted in the spaces or troughs between the upwardly facing reflecting surfaces of sheet 28. The construction of the solar cells per se is not critical to the invention. Examples of suitable solar cells are described in U.S. Pat. Nos. 3,686,036; 3,658,596; 3,713,893; 3,849,880; 3,912,540; Re. 28,610 and the various patents referred to therein. Obviously terminal leads (not shown) will be included for attaching the solar cells 42 to a storage means or to a work station. The solar cells preferably are supported by trough-like members indicated generally at 44. Each of the trough-like members 44 are generally vee-shaped and are mounted on frame member 12 so as to surround in part an associated lower guide member 20. However, each member 44 is arranged so that its inner surfaces 46 and 48 are slightly spaced from the associated guide member 20 for accommodating sheet 28. Member 44 is formed of a light weight, relatively rigid, plastic material, such as a urethane foam.

Also seen particularly in FIG. 3, an elongate, flat tubular member 50 is mounted in the interior space of each of the members 44. The solar cells 42 overlie and are affixed to the upper surface of members 50. Tubular members 50 preferably are made of a metal or metal alloy so as to be heat conductive, and are secured to members 44 by means of a cement or a friction fit. If desired the opposite ends of members 50 may be left open so as to permit flow of air through the tubular members to cool the solar cell 42. Preferably, however, the ends of tubular members 50 are connected through suitable conduit means 52 to a heat dissipation and storage system which is adapted to circulate a heat exchange fluid through members 50 and thereby to also utilize, in known manner, thermal energy collected by the solar energy concentrator. More specifically, the circulating heat exchange fluid cools the solar cells 42 (which tend to be heated by the received radiant energy) and this heat may be extracted from the heat exchange fluid for domestic hot water or space-heating purposes.

Reflective sheet 28 is shaped by frame 10 (and wires 40) in known manner so that solar radiation falling upon the reflective surfaces of sheet 28 will be reflected and directed onto solar cells 42. Various solar energy concentrator geometries are well known in the art (see for example, in U.S. Pat. Nos. 3,923,381; 3,490,950; 3,510,714 and 3,990,914, and the various patents and literature references cited therein. Inasmuch as the geometry of solar energy concentrators constructed in accordance with the teachings of the present invention may be varied by one skilled in the art without departing from the invention per se, they will not be further discussed herein. The simplest trough configurations is where the sides of the trough are flat and straight, as shown in the drawings. However, it should be noted that by providing appropriately curved relatively thin, transparent ribs 56 running between guide members 20 and 22, it is possible for ribs 56 and guide members 20 and 22 to shape flexible sheet 28 so that the sides of the troughs formed by the sheet are curved to form parabolic or modified parabolic reflectors as taught by Winston in U.S. Pat. No. 3,923,381 (see FIG. 4).

One skilled in the art will appreciate that solar energy concentrators constructed in accordance with the teachings of the present invention are relatively light weight, and may be constructed using relatively low cost and commercially available material. Moreover, a unique feature of the solar energy concentrator of the present invention is the capacity to store a supply of reflective sheet material 28 on the concentrator so that when it may later become necessary to replace the reflective sheet material, e.g. due to degradation of the polyethylene terephthalate film 24 upon prolonged exposure to sunlight, replacement may be simply and easily accomplished, and without interrupting collection of solar energy. Thus, to replace a degraded section of reflective film one merely has to operate motor 36 to draw degraded film onto take-up reel 26, whereby simultaneously fresh make-up film will be drawn from supply reel 24 into position on frame 10.

Other advantages of the solar energy concentrator of the present invention will be apparent to one skilled in the art. For example, the solar concentrators of the present invention, when used with solar cells, may be adapted for cooling the solar cells so that the cells may be operated at their maximum efficiency temperature range. Furthermore, the heat energy received by the solar cells may be recovered for space heating or for conversion to mechanical energy. Still another advantage is that the design life of the solar concentrator can be matched to equal the estimated life of the structure to which it is mounted. Furthermore, the solar concentrators of the invention may function as simple thermal converters simply by removing the solar cells and allowing radiant energy to impinge directly on flat tubes 52.

While there has been described what is at present considered to be the preferred embodiment of this invention, various changes and modifications may be made therein without departing from the scope of the invention. For example, guide members 22 and 20, respectively, may be mounted for rotation on their elongate axes, i.e. so as to facilitate advancing the film over the guide members. Also, if desired, foam members 54 may be provided for mounting in trough-like members 44. As seen in FIG. 2 and 3, members 54 are attached to side members 18a – 18f and are arranged to lie close to sheet material 28. They provide support for tubular members 50, and also help to shape reflective material 28 adjacent the solar cells 42.

Also, although the drawings show only a single solar cell 42 in each trough member 44, it is to be understood that each trough member 44 may contain more than one solar cell and that the several solar cells in the same trough or in different troughs could be connected in parallel or in series as desired. It also is contemplated that members 44 could be molded of plastics other than those of the foamable type, e.g. polyvinyl chloride. However, a cellular or foamed plastic is preferred where light weight is a consideration. Another possible modification is closing off the ends of the troughs with end walls, e.g. by replacing the two sets of side members 18a – 18f with two large side wall panels that are affixed to base 12, in which case the guide rods 20 and 22 would be affixed to and extend between the two side panels. The end walls for the troughs preferably would have reflecting surfaces to direct energy onto the solar cells.

Still another modification is shown in FIG. 5 wherein more stiff wires 58 are provided running parallel to guide members 20 and 22 between side members 18. The result is essentially a ridged reflecting surface with flexible sheet 28 being held under tension and forming troughs whose sides comprise multi-faceted flat reflectors.

Still other modifications will be obvious to one skilled in the art.

What is claimed is:

1. A solar energy concentrator comprising:
(A) a rigid frame comprising a plurality of spaced upper and lower guide members, and
(B) a flexible sheet material which is reflective to light supported by said frame, said flexible sheet material being threaded alternately over said upper guide members and under said lower guide members in repeating fashion so as to form a reflective ridged surface which defines a plurality of troughs.

2. A solar energy concentration according to claim 1, wherein each of said upper and lower guide members are generally parallel to one another.

3. A solar energy concentrator according to claim 1 further including a supply reel on one end of said frame for holding a supply of flexible sheet material, and a take-up reel on the other end of said frame.

4. A solar energy concentrator according to claim 3 including means for maintaining said film under tension between said supply reel and said take-up reel.

5. A solar energy concentrator according to claim 1 wherein said flexible sheet material comprises a polymeric film having a metallic film bonded thereto.

6. A solar energy concentrator according to claim 5 and including at least one transparent sheet covering said metallic film 7. A solar energy concentrator according to claim 5 wherein said polymeric film comprises polyethylene terephtalate film.

8. A solar energy concentrator according to claim 1, further including at least one solar energy converter means disposed in at least one of said troughs.

9. A solar energy concentrator according to claim 8 wherein said solar energy converter means comprises a solar cell.

10. A solar energy concentrator according to claim 8 wherein said solar energy converter means is a conduit capable of absorbing solar energy and converting the same to thermal energy.

11. A solar energy concentrator comprising:
(A) An elongate flexible sheet material which is reflective to light, and
(B) a rigid frame supporting said flexible sheet material so as to form a reflective ridged surface, said rigid frame comprising (i) a first plurality of elongate members which are (i) spaced from one another and (ii) generally parallel to one another; a second plurality of elongate members which are (a) spaced from one another, and (b) generally parallel to one another, and (c) spaced from and generally parallel to members of said first plurality; (ii) a supply reel for holding a supply of said flexible sheet material; and (iii) a take-up reel for collecting said flexible sheet material.

12. A solar energy concentrator according to claim 11 wherein said flexible sheet material is threaded alternatively over members of said first plurality, and under members of said second plurality, between said supply reel and said take-up reel.

* * * * *

UNITED STATES PATENT AND TRADEMARK OFFICE
CERTIFICATE OF CORRECTION

PATENT NO. : 4134387

DATED : January 16, 1979

INVENTOR(S) : Eric Tornstrom

It is certified that error appears in the above-identified patent and that said Letters Patent are hereby corrected as shown below:

Claim 2, Column 6, line 1, "concentration" should be

-- concentrator --.

Signed and Sealed this

Seventeenth Day of April 1979

[SEAL]

Attest:

RUTH C. MASON
Attesting Officer

DONALD W. BANNER
Commissioner of Patents and Trademarks